United States Patent [19]

Shinpo et al.

[11] Patent Number: 5,289,980
[45] Date of Patent: Mar. 1, 1994

[54] GLASS VESSEL CRUSHER

[75] Inventors: Toshio Shinpo, Fujisawa; Sadao Ueda, Kawasaki; Shuji Kitao, Yokohama; Yoshifumi Ito, Tokyo, all of Japan

[73] Assignee: Toyo Glass Co., Ltd., Tokyo, Japan

[21] Appl. No.: 977,871

[22] Filed: Nov. 17, 1992

[30] Foreign Application Priority Data

Nov. 21, 1991 [JP] Japan .................................. 3-332454

[51] Int. Cl.$^5$ ............................................. B02C 19/12
[52] U.S. Cl. ...................................... 241/99; 241/761.1
[58] Field of Search ...................... 241/99, 246, 257.1, 241/258, 260.1, 261.1

[56] References Cited

U.S. PATENT DOCUMENTS 3,933,317  1/1976  Revere .............................. 241/261.1

FOREIGN PATENT DOCUMENTS 15567  2/1979  Japan .................................. 241/261.1

Primary Examiner—Douglas D. Watts
Attorney, Agent, or Firm—Sughrue, Mion, Zinn, Macpeak and Seas

[57] ABSTRACT

A glass vessel crusher including an external cylinder 1 and an internal cylinder disposed in the external cylinder, a glass-vessel crushing space A of ring shape in section being defined by the inner wall of the external cylinder 45 and the outer wall of the internal cylinder. At least one of the external cylinder and the internal cylinder is freely rotatable and is so designed that the glass-vessel crushing space is gradually narrowed along a direction from a glass-vessel throw-in side toward a fragment discharge side, and at least one of the inner wall of the external cylinder and the outer wall of the internal cylinder is provided with a spiral projection 57 extending into the ring-shaped glass-vessel crushing space.

6 Claims, 3 Drawing Sheets

GLASS VESSEL CRUSHER

BACKGROUND OF THE INVENTION

1. Field of the Invention

This invention relates to a glass vessel crusher for crushing a glass bottle or the like into fragments in a proper size.

2. Description of Related Art

It has been a general habit that a glass vessel such as a glass bottle or the like is used and then thrown away without recycling because a recycling system for the glass vessel has not been hitherto established. Such a habit of using and throwing away the glass vessel has caused a vain use of resources and has been a factor of environmental contamination. The recycling of glass bottles has been particularly shunned because they have a bulky body, so that the physical distribution cost is increased and the cost required for recycling is also heightened. In order to overcome this disadvantage, there has been conventionally adopted a method that glass bottles are finely crushed using a glass-bottle crusher and then recycled in a state where their bulkiness is reduced.

As a conventional glass bottle crusher have been known a propeller-type crusher and a squash-type crusher. In the propeller-type crusher, a glass bottle is collided against a propeller rotating at a high speed, so that it is finely crushed by an impact force at the collision. On the other hand, in the squash-type crusher, for example, a glass bottle is sandwiched between two iron plates, and then is squashed by pressing the iron plates so as to be approached to each other.

In the propeller-type crusher, a glass bottle is excessively finely crushed, and thus excessively-fine glass fragments of the glass bottle are generated. If this type of crusher is placed on a street for example, there would occur a new environmental problem that these excessively-fine glass fragments are scattered in the street.

Further, the fragments of the glass bottle which have been withdrawn are required to be washed with water in a glass factory to remove foreign matters such as metal from the fragments. In this case, fragments whose size is below several millimeters are frequently required to be discarded on the basis of a requirement for water administration. Therefore, if the fragments of a glass bottle are excessively fined by the crusher, most of the fragments which have been withdrawn must be discarded, and thus there occurs a problem that all of glass bottles which have been withdrawn with much labor can not be effectively used.

On the other hand, the squash-type crusher has the following disadvantage that a tremendous noise occurs in a crushing operation, and glass fragments are liable to be scattered at the throw-in side for a glass bottle. Therefore, this type of crusher is unsuitable to be placed in a street in consideration of security and environment problem.

SUMMARY OF THE INVENTION

An object of this invention is to provide a glass vessel crusher capable of crushing a glass vessel into fragments in a proper size without inducing tremendous noise.

In order to attain the above object, a glass vessel crusher according to this invention includes an external cylinder and an internal cylinder disposed in the external cylinder, a glass-vessel crushing space of ring shape in section being defined by the inner wall of the external cylinder and the outer wall of the internal cylinder, wherein at least one of the external cylinder and the internal cylinder is freely rotatable and is so designed that the glass-vessel crushing space is gradually narrowed along a direction from a glass-vessel throw-in side toward a fragment discharge side, and at least one of the inner wall of the external cylinder and the outer wall of the internal cylinder is provided with a projection extending into the ring-shaped glass-vessel crushing space.

According to the crusher of this invention, glass vessels which are thrown away into the external cylinder are oriented in various directions such as longitudinal, lateral and slant directions in the glass-vessel crushing space at an initial stage. Through rotation of the external cylinder or internal cylinder, the glass vessels are scratched while the orientation angle thereof is gradually varied, and then slowly squashed with a relatively weak force between the external cylinder and the internal cylinder. Since the glass-vessel crushing space is so designed as to be gradually narrowed along the direction from the throw-in side of the glass vessels toward the fragment discharge side, the glass vessels are roughly crushed in a large size at the upper portion of the glass-vessel crushing space, and fall down in the space while being squashed over several times, so that the glass vessels are gradually fined while they fall down from the glass-vessel throw-in side to the fragment discharge side. Finally, only those glass fragments which are passed through a gap between an outer peripheral portion at the lower end of the internal cylinder and an inner peripheral portion at the lower end of the external cylinder are discharged to the outside of the external cylinder.

DETAILED DESCRIPTION OF THE PREFERRED EMBODIMENT

A preferred embodiment of this invention will be hereunder described with reference to the accompanying drawings.

Figure 1:
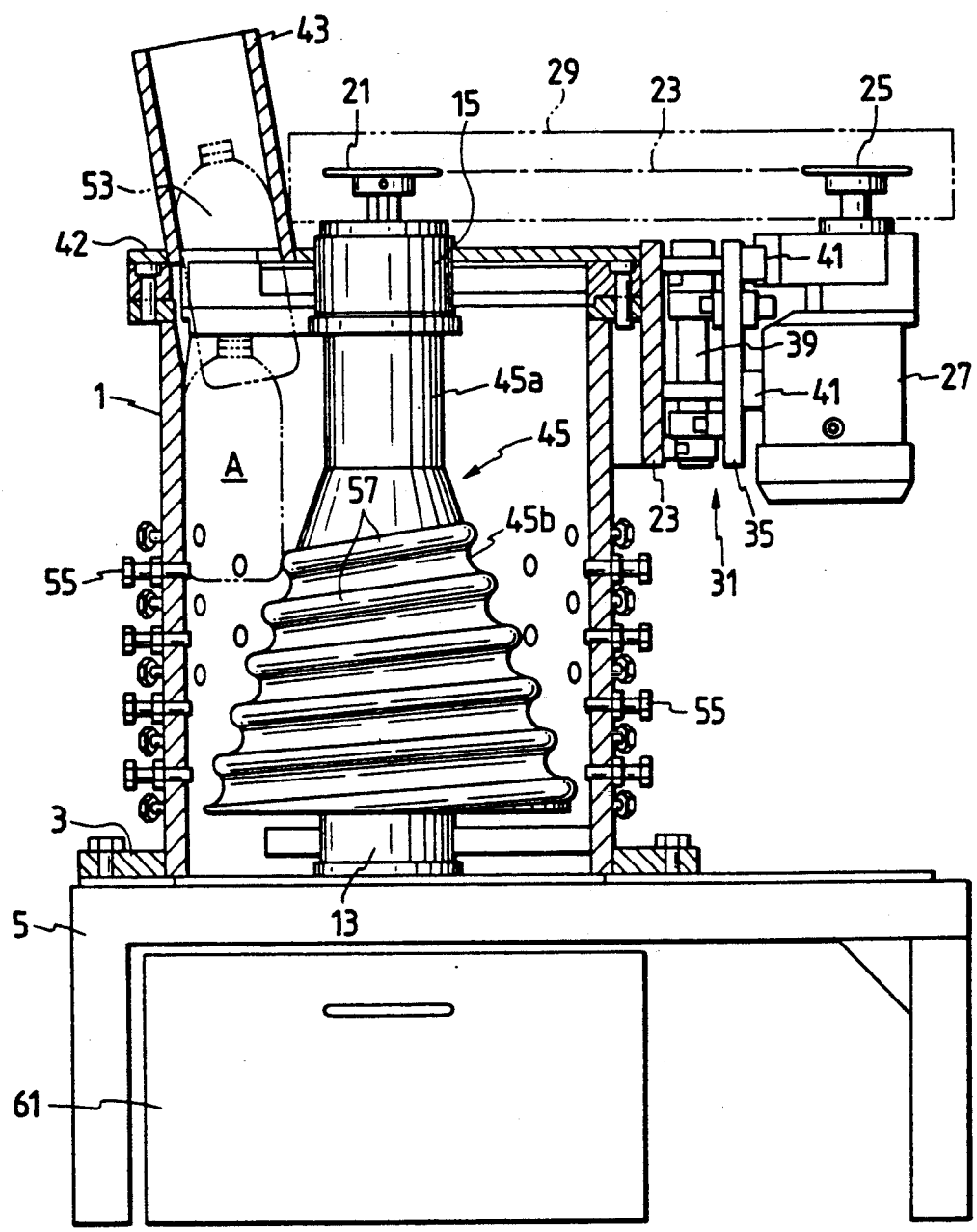
FIG. 1 is a longitudinal-sectional view of one embodiment of a glass vessel crusher according to this invention.
Figure 2:
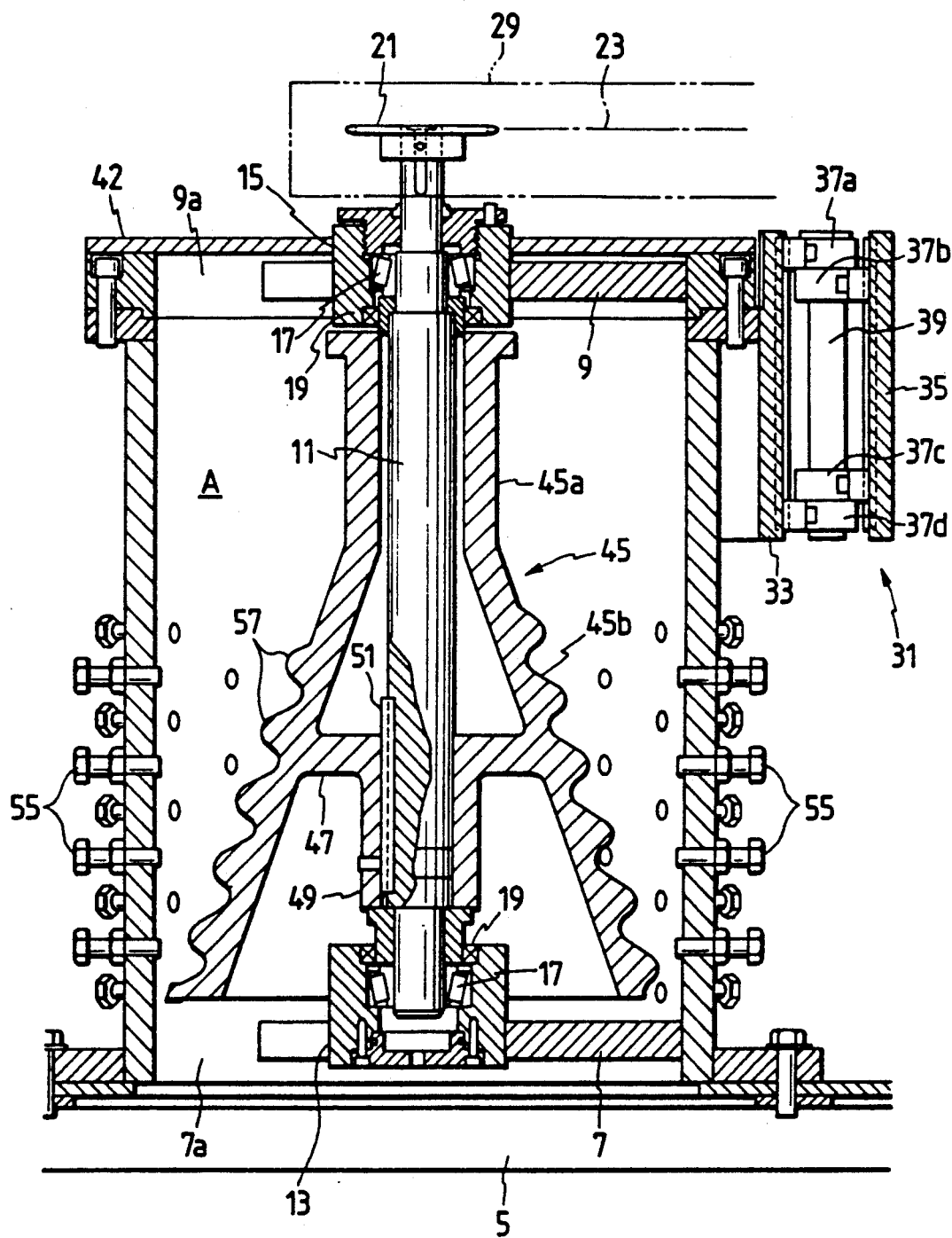
FIG. 2 is a longitudinal-sectional view of a main part of the crusher as shown in FIG. 1.

FIG. 1 is a longitudinal-sectional view of one embodiment of a glass vessel crusher according to this invention, and FIG. 2 is a longitudinal-sectional view of a main part of the crusher as shown in FIG. 1. The following embodiment is described particularly in a case where the crusher of this invention is used to crush a glass bottle, however, this invention is applicable to other kinds of glass vessels such as glass plate, glass containers, etc.

In FIG. 1, a reference numeral 1 represents an external cylinder, and is secured through a flange 3 to a frame 5. As shown in FIG. 2, a lower wall 7 is mounted to an inner peripheral portion of the lower end of the external cylinder 1 while an upper wall 9 is mounted to an inner peripheral portion of the upper end of the external cylinder 1.

Figure 3:
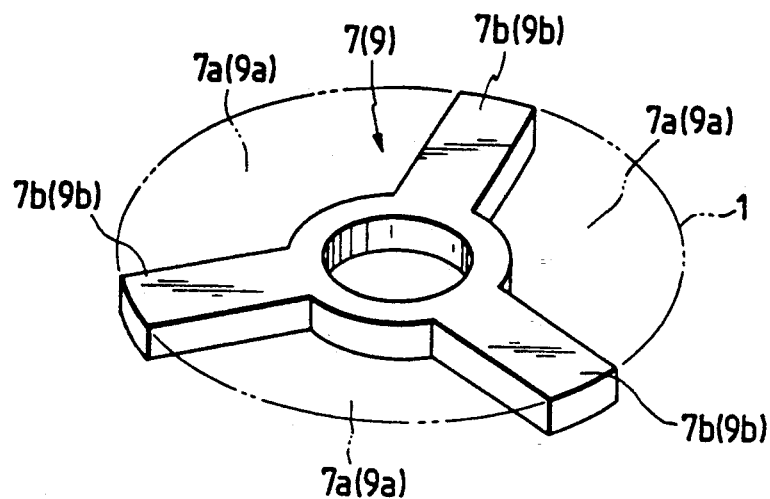
FIG. 3 is a perspective view of the upper and lower walls of the crusher as shown in FIG. 1.

FIG. 3 shows the detailed construction of each of the upper and lower walls 7 and 9. As shown in FIG. 3, each of the upper and lower walls has a ring and three support portions 7b (9b) which are integrally formed with the ring so as to radially extend from the ring. Therefore, when each of the upper and lower walls 7b (9b) is secured to the external cylinder 1, an opening portion 7a (9a) is formed between the neighboring support portions 7b (9b).

A rotary shaft 11 is suspended between the upper and lower walls 9 and 7, and both end portions of the rotary shaft 11 are freely rotatably supported in bearing housings 13 and 15 which are secured to the lower and upper walls 7 and 9, respectively. Each of the bearing housings 13 and 15 is designed in a symmetrical structure, and a conical bearing 17 for supporting the rotary shaft 11 and an oil seal 19 are accommodated in each of the bearing housings 13 and 15.

The upper end portion of the rotary shaft 11 extends so as to penetrate through the bearing housing 15, and is fixedly secured to a sprocket 21. A chain 23 is suspended between the sprocket 21 and another sprocket 25 which is rotated by a motor 27. Therefore, a rotational force of the motor 27 is transmitted through the sprocket 25 and the sprocket 21 to the rotary shaft 11. A reference numeral 29 represents a chain cover for the chain 23.

The motor 27 is secured to the outer wall of the external cylinder 1 through a securing mechanism 31. The securing mechanism 31 comprising a fixing base 33 which is fixed to the external cylinder 1, and a motor base 35 which is fixed to the motor 27. Both of the fixing base 33 and the motor base 35 are linked with each other through two pairs of bearings 37a to 37d located at the upper and lower sides respectively and a shaft 39 in such a manner that the motor base 35 is freely swingable around the shaft 39. A reference numeral 41 represents a jack bolt.

Figure 4:
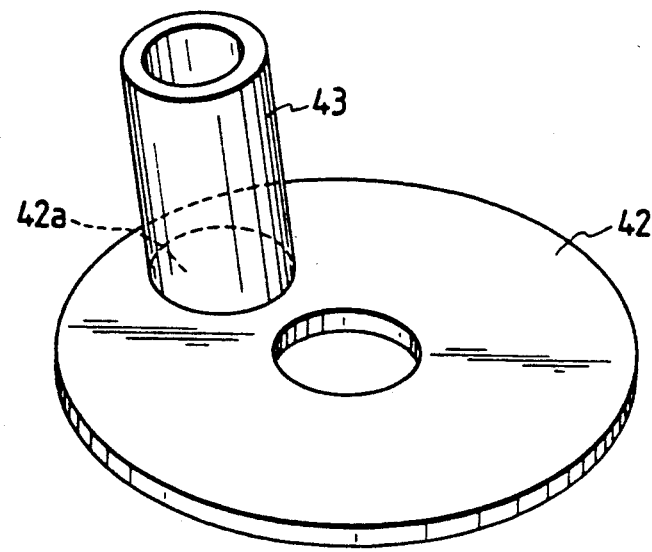
FIG. 4 is a perspective view of a throw-in cylinder for a glass bottle which is used for the crusher as shown in FIG. 1.

According to this embodiment, a lid member 42 for closing an upper opening of the external cylinder 1 is further provided at the upper side of the upper wall 9. The lid member 42 has an opening 42a therein, and a throw-in cylinder 43 is slantingly engaged with the opening 42a of the lid member 42 as shown in FIG. 4. The throw-in cylinder 43 serves as an opening through which a glass bottle 53 is thrown into the external cylinder 1.

Inside of the external cylinder 1 is disposed an internal cylinder 45 which is rotatable integrally with the rotary shaft 11. The internal cylinder 45 comprises a cylindrical portion 45a serving as an upper portion thereof and a conical portion 45b serving as a lower portion thereof. As is apparent from FIG. 2, the cylindrical portion 45a and the conical portion 45b are formed integrally with each other, and a boss portion 49 is supported through a support 47 on the inner wall of the conical portion 45b. The rotary shaft 11 is engaged with the boss portion 49, and both of the rotary shaft 11 and the boss portion 49 are linked with each other through a key 51.

A crushing space A in which the glass bottle 53 is crushed is defined between the inner wall of the external cylinder 1 and the outer wall of the internal cylinder 45. The crushing space has a ring shape in section, and is so designed as to be gradually narrowed along a direction from the upper portion of the external cylinder 1 to the lower portion thereof. Therefore, the glass bottle 53 is gradually fined while it falls down along the direction from the upper portion of the external cylinder 1 to the lower portion thereof. In this embodiment, the gradually-narrowed shape of the crushing space is caused by the conical shape of the internal cylinder 45 as shown in FIGS. 1 and 2.

In addition, a plurality of post or stud members such as bolts 55 are secured to the outer wall of the external cylinder 1 in its axial (longitudinal) direction and in its peripheral direction at a substantially constant interval, and the tip portion of each bolt 55 is projected at a suitable length through the side wall of the external cylinder 1 into the crushing space A. The tip of portion of each bolt 55 is preferably pointed, and the length at which the tip portion of each bolt 55 is projected into the crushing space is preferably variable. The number of the bolts 55 which are located in the peripheral direction on the external cylinder is preferably from 6 to 12, and the bolts 55 which are located in the axial direction on the external cylinder are preferably disposed at an interval of 50 to 70 mm.

A chain or spiral member 57 is formed on the outer peripheral surface of the conical portion 45b of the internal cylinder 45 in such a manner as to be projected from the outer peripheral surface into the crushing space A. The spiral member 57 and the plural bolts 55 are so disposed that the glass bottle 53 which is thrown into the crushing space A is scratched in cooperation therebetween in the crushing space A. The spiral member 57 is not necessarily formed as a continuous body on the external cylinder 1, but may be formed as an intermittent body.

The following features are required for the crusher. Firstly, the noise must be small in a crushing operation, and secondly the glass fragments are not excessively finely crushed. In order to achieve these requirements, various experiments have been attempted. Through these experiments, it has been proved that the glass bottle 53 should be beforehand scratched and then slowly squashed with a relatively weak force to effectively crush the glass bottle 53.

According to this embodiment, the glass bottle 53 which is thrown into the ring-shaped crushing space A through the throw-in cylinder 43 is first scratched by the tip portions of the bolts 55 and the spiral member 57, and then gradually squashed with a relatively weak force through the gradually-narrowed crushing space A.

At an initial stage where the glass bottles 53 are thrown into the crushing space A, the glass bottles 53 are oriented in various directions (longitudinal, lateral and slant directions). When the motor 27 is rotated in this state, interlockingly with the rotation of the internal cylinder 45, the glass bottles 53 are rotated with the orientational directions thereof being varied. Through this operation, the glass bottles 53 are scratched by the bolts 55 and the spiral member 57, and then the scratched glass bottles 53 are slowly squashed between the external cylinder 1 and the internal cylinder 45 with a relatively weak force. In this case, the rotational speed of the internal cylinder is preferably set to 4 to 40 rpm.

The glass bottle 53 is roughly crushed at the upper portion of the crushing space A, and the roughly-crushed bottle 53 is squashed several times in the crushing space A while falling down from the upper portion of the crushing space A to the lower portion thereof, so that it is gradually fined. Finally, only those glass fragments which are passed through a gap between the outer peripheral portion of the lower end of the internal cylinder 45 and the inner peripheral portion of the lower end of the external cylinder 1 are discharged to the outside of the external cylinder 1. The openings 7a of the lower wall 7 serve as a discharge port for the glass fragments, and the crushed glass fragments are stored in a hopper 61 located beneath the discharge port. The hopper 61 can be freely drawn out from the crusher as shown in FIG. 1.

According to the crusher of this embodiment, the glass bottle 53 is crushed by squashing it with a relatively weak force while scratching at. Therefore, in comparison with the conventional crusher, the noise occurring in the crushing operation is more suppressed, and the glass bottle 53 can be crushed into glass fragments of a more proper size. Accordingly, even if the crusher thus constructed is placed on a street for example, no environmental problem occurs, so that a recycling system for the glass bottles can be promoted using this crusher.

When the crusher of this embodiment is applied, no restriction is imposed on color, shape and components of a glass bottle. Further, even when the glass bottle is coated with a label or resin on the surface thereof, it can be easily crushed.

This invention is not limited to the embodiment as described above. The following modifications may be made to the above embodiment without departing from the subject matter of this invention.

In the above embodiment, the external cylinder 1 is fixed, and the internal cylinder 45 is rotated relatively to the external cylinder 1. However, the external cylinder 1 may be rotatable relatively to the internal cylinder 45 which is fixed. Otherwise, both of the external cylinder 1 and the internal cylinder 1 may be rotatable. Further, at least one of the external cylinder 1 and the internal cylinder 45 may be formed in a conical shape. Therefore, in this embodiment the internal cylinder 45 is provided with the conical portion 45b, however, the conical portion may be provided to the external cylinder 1.

What is claimed is:

1. A glass vessel crusher, comprising:

an external body of revolution (1); and
an internal body of revolution (45) disposed in the external body of revolution, an annular glass vessel crushing space (A) being defined by an inner wall of said external body of revolution and an outer wall of said internal body of revolution, wherein at least one of said external body of revolution and said internal body of revolution is rotatable and is so designed that the glass vessel crushing space is gradually narrowed along a direction from a glass vessel introduction end toward a fragment discharge end, at least one of the inner wall of said external body of revolution and the outer wall of said internal body of revolution is provided with a projection extending into the annular glass vessel crushing space for conveying glass vessels towards the discharge end, and at least one of said external body of revolution and said internal body of revolution, not provided with said projection, is provided with a plurality of spaced post members (55) individually projecting from a side wall thereof into the glass vessel crushing space.

2. The glass vessel crusher as claimed in claim 1, wherein at least one of said external body of revolution and said internal body of revolution has a conical portion projecting into the glass vessel crushing space.

3. The glass vessel crusher as claimed in claim 2, wherein said conical portion has a spiral projection member which is continuously or intermittently formed on the surface thereof.

4. The glass vessel crusher as claimed in claim 1, further including a rotary shaft which is linked to one of said external body of revolution and said internal body of revolution to rotate the linked one of said external body of revolution and said internal body of revolution.

5. The glass vessel crusher as claimed in claim 4, further comprising a rotating mechanism for rotating said rotary shaft.

6. The glass vessel crusher as claimed in claim 6, wherein said rotating mechanism comprises a motor, a sprocket linked to one end of said rotary shaft, another sprocket linked to said motor, and a chain suspended between said sprockets.

* * * * *